J. S. Hall.
Rolling Plates, Bars and Shafting.
No. 151. Reissued Dec. 4, 1849.
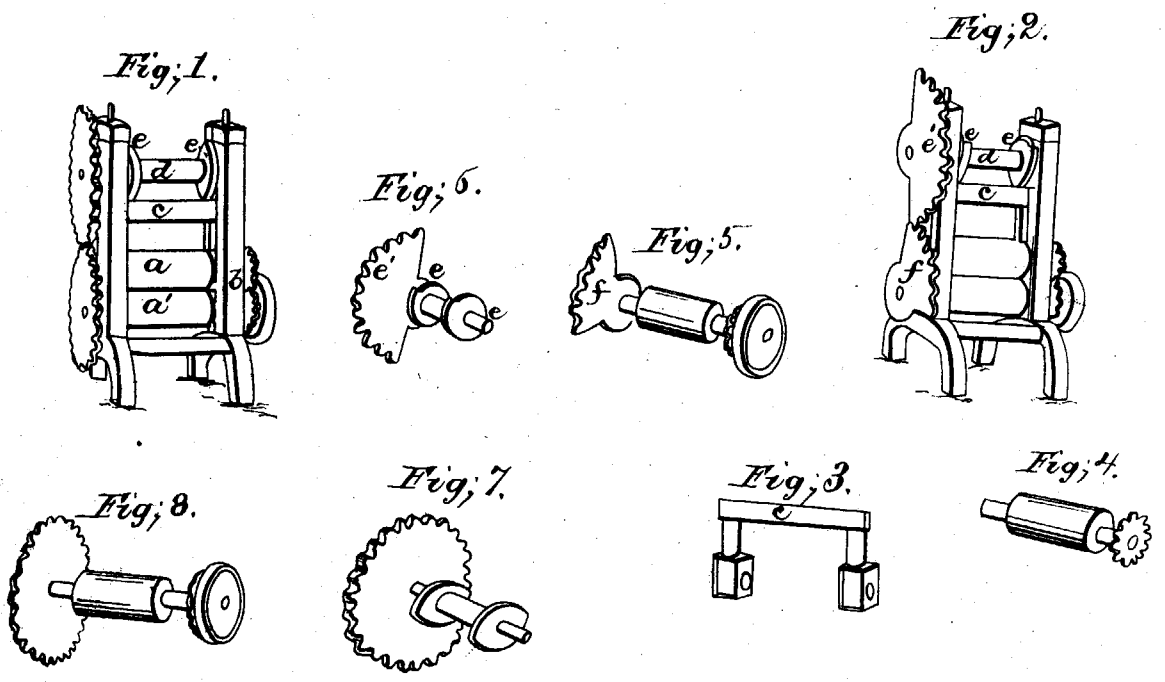
THE GRAPHIC CO. PHOTO.-LITH. 39 & 41 PARK PLACE, N.Y.

UNITED STATES PATENT OFFICE.

JNO. S. HALL, OF COLUMBUS, OHIO.

MILL FOR ROLLING IRREGULAR SHAPES BY MEANS OF A CAM-PATTERN.

Specification forming part of Letters Patent No. 6,079, dated January 30, 1849; Reissue No. 151, dated December 4, 1849.

*To all whom it may concern:*

Be it known that I, JOHN S. HALL, of Columbus, in the county of Franklin and State of Ohio, have invented certain new and useful Improvements in Rolling Iron to Patterns; and I do hereby declare that the following is a full, clear, and exact description of the principle or character which distinguishes them from all other things before known, and of the usual manner of making, modifying, and using the same, reference being had to the accompanying drawings, which form a part thereof, in which—

Figure 1 is a perspective view. Fig. 2 is a similar view of a modification. Figs. 3, 4, 5, 6, 7, 8 are detached parts.

The same letters are used to distinguish like parts in all the figures.

The nature of my invention consists in connecting with the rollers of an ordinary rolling-mill a cam-shaft with cams thereon to act upon the boxes in which one of the rollers turn, so as to cause it to rise and fall to draw bars to any pattern by changing the relative size of the gearing; to make on a small cam a sufficient pattern for rolling a long bar, thus making a compact and variable machine by simply changing the gearing, or, when the peculiar character of the pattern requires it, making the cam move faster, so as to reduce the pattern.

The construction is as follows: The rollers *a a* and frame *b* are like those of any ordinary rolling-mill, except that the frame extends up higher on the sides. The boxes in which the upper or lower roller turns and bears are connected by a bar or roller, *c*. (See Fig. 3.) Above the bar there is a cam-shaft, *d*; on which are two cams, *e*, one near each end. These cams are to be made of any pattern, in accordance with the irregular form required to be rolled. This pattern may be shorter or longer than the article to be formed, and the cam-shaft must be geared to one of the rollers, with wheels so proportioned as to turn the cam in proper ratio slower or faster than the rollers themselves turn.

Instead of making the cam to revolve entirely around, I sometimes use a segment-rack, as shown at *e*, Fig. 2, and weight it, so that it shall keep in proper position when detached from a similar segment, *f*, connected with the lower roller. By this arrangement the cam-shaft is revolved part way round, and then becomes detached and falls back till the roller again comes round; or the bar or roller *c* may be left out entirely and let the cam or pattern down directly on top of roller *a a*; or the cam or pattern may be placed under the bottom roller, so as to cause it to rise and fall, as may be wanted. An inspection of the drawings will at once show these modifications, and others in the greatest variety are too obvious to suggest themselves to a competent mechanic, who can also proportion the parts to adapt themselves to the work to be done.

Having thus fully described my improved apparatus for rolling metal to an irregular thickness by pattern, I wish it to be understood that I do not claim moving the top roller up and down by a pattern, that having already been done; but

What I do claim as my invention, and desire to secure by Letters Patent, is—

The employment of cams, as herein described, for elevating or depressing one of the rollers, of a rolling-mill, in combination with gearing, the same as above set forth, so that a pattern of any length on the cam may be made to effect the surface of any given length of bar in proportional ratio by change of the relative size of the gearing, by which I avoid in rolling long bars any long patterns difficult to handle and expensive to construct.

JOHN S. HALL.

Witnesses:

T. H. DRAKE,

P. S. LAKIN.